United States Patent [19]

Tate et al.

[11] 3,979,315

[45] Sept. 7, 1976

[54] METHOD FOR TREATING SCALE

[75] Inventors: Jack F. Tate; Russell D. Shupe; Jim Maddox, Jr., all of Houston, Tex.

[73] Assignee: Texaco Inc., New York, N.Y.

[22] Filed: Dec. 20, 1974

[21] Appl. No.: 534,960

[52] U.S. Cl. .................................. 252/180; 210/58; 252/8.55 B; 252/181
[51] Int. Cl.² ............................................ C02B 5/06
[58] Field of Search ................ 252/8.55 B, 8.55 D, 252/180, 181, 551, 554, 558; 210/58; 260/513 R, 513 B

[56] References Cited
UNITED STATES PATENTS

| | | | |
|---|---|---|---|
| 2,535,678 | 12/1950 | Hollander et al. | 252/513 R |
| 2,592,511 | 4/1952 | Chittum | 252/8.55 B |
| 3,502,587 | 3/1970 | Stanford et al. | 252/180 |
| 3,827,497 | 8/1974 | Dycus et al. | 252/8.55 D |

*Primary Examiner*—Herbert B. Guynn
*Attorney, Agent, or Firm*—T. H. Whaley; C. G. Ries; James F. Young

[57] ABSTRACT

Composition and method for the treatment of inorganic mineral scale, particularly calcium and/or barium sulfate scale, using a treating composition consisting of a water-soluble sulfonated ethoxylated alkylphenol of prescribed formula in an amount of from about 0.0005 to about 0.005%, on a weight basis.

4 Claims, No Drawings

METHOD FOR TREATING SCALE

This invention relates to a composition useful in treating oil and gas wells and to a method of using such composition for such treatment. More particularly this invention is directed to a composition and method useful in the prevention and/or inhibition of the build-up of undesirable inorganic mineral scale deposits in oil and gas wells, their flow lines, auxiliary producing equipment, such as heat exchangers and cooling towers, as well as the producing strata in the vicinity of the well bore. Additionally, the invention is useful in the prevention and/or inhibition of buildup of scale deposits in aqueous systems susceptible to mineral scale formation.

The formation of objectionable scale deposits, such as calcium and barium sulfate and calcium carbonate, or more broadly, the sparingly water soluble alkaline earth metal sulfates and carbonates, hereinafter referred to as "inorganic mineral scale," is rather widespread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams at the well bore may result in the deposition of crystalline calcium sulfate which gradually builds up on the walls of the well tubing, for example, to a point where it may choke off fluid flow in the tube if remedial measures were not undertaken.

Another cause of the inorganic mineral scale formation is attributed to the precipitation of scale material from potentially supersaturated solutions thereof. When the operating variables of temperature and pressure change adversely, or solvent is allowed to evaporate, thus concentrating the solutions, precipitation of the salt on the tubing and surrounding strata occurs.

The use of strong alkali solutions for the removal of calcium sulfate species of inorganic mineral scale has been proposed. It has been claimed that under certain favorable conditions of temperature and time, concentrated alkali solutions will, in some cases, provide a break-up of the build-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This precipitate may then be removed by suitable mechanical means. Such a method is obviously undesirable in that considerable periods of time are involved and the use of mechanical apparatus is expensive, and in some cases, either undesirable or mechanically impossible. Moreover, strong aqueous alkali is not effective in preventing or inhibiting the build-up of scale deposits in well tubing, production equipment and the producing strata about the bore hole.

It is, accordingly, an object of this invention to provide a method of inhibiting and/or preventing the build-up of inorganic mineral scale deposits in gas and oil flow lines, auxiliary equipment, well tubing and the surrounding subsurface strata.

A further object is to provide an inorganic mineral scale treating composition for use in preventing the build-up of scale deposits in the well tubing, producing equipment, the bore hole and surrounding strata.

A still further object of this invention is to provide a method of and composition for the treatment of gas and oil well tubing and the like containing inorganic mineral scale therein to prevent and/or inhibit the build-up of further scale deposits in the tubing.

These as well as other objects are accomplished according to the present invention which comprises an inorganic mineral scale prevention and/or inhibition composition comprising a water-soluble sulfonated, ethoxylated, alkylphenol, having the following general formula

$$R(OCH_2CH_2)_nSO_3^-A^+$$

wherein R is alkaryl containing from about 6 to 18 carbon atoms in the alkyl portion thereof, n is a number from one to 10 including fractions, and $A^+$ is a monovalent cation such as sodium, potassium or ammonium, including mixtures, which is employed continuously at a concentration of from about 0.0005 to about 0.005%, on a weight basis.

The invention also comprises a method of treating equipment susceptible to the development of scale deposits therein such as heat exchangers and the like, and particularly oil field equipment, using the aforesaid scale prevention and/or inhibition composition.

Representative examples useful in the practice of the invention include the straight and branched chain alkylphenols such as the hexyl-, isohexyl-, heptyl-, octyl-, isooctyl-, nonyl-, decyl-, dodecyl-, tridecyl-, tetradecyl-, and hexadecyl-, species, containing one or more ethoxy groups attached to the alkylphenols; for example, the di-, tri-, tetra-, penta-, hexa-, octa-, nona-, and decaethoxy compounds which have been sulfonated. A preferred group of compounds include the sodium and ammonium salts of sulfonated $C_8$–$C_{16}$ alkylphenols containing from about 3 to about 10 ethoxy groups therein.

In carrying out one aspect of the present invention the method thereof comprises introducing the scale prevention composition into the equipment to be protected, such as oil well tubing, in the form of an aqueous solution in an amount sufficient to provide the said treating composition continuously therein in an amount of from about 0.0005 to about 0.005%, preferably 0.001 to 0.003%, on a weight basis, and maintaining the treating composition in contact with the internal surfaces thereof therein to prevent and/or inhibit the development of scale deposits or additional scale deposits therein. It is desirable to circulate the scale prevention composition through the system continuously to provide adequate contact of the composition and insure its presence in the potentially scaling water at all times. Underground strata surrounding the well bore can be treated in a like manner, i.e. by passing the solution into said strata such as by injection of the solution down through the bore hole or production tubing, preferably under pressure.

Use of the said treating composition in an amount of below about 0.0005% does not provide satisfactory scale inhibition properties while amounts above about 0.005% are unnecessary.

In addition, it has been found that excellent protection against continued deposition of objectionable scale deposits can be obtained by maintaining the treating composition in contact with preexisting scale continuously in a concentration of from about 0.0005 to about 0.005%.

A more complete understanding of the invention will be obtained from the following illustrative examples.

The following procedure was used in the evaluations.

A 600 milliliter glass beaker was provided with sufficient calcium sulfate and sodium chloride, obtained by mixing solutions of calcium chloride and sodium sulfate and adding additional solid sodium chloride, to produce an aqueous concentration thereof of 10,000 ppm of calcium sulfate and 50,000 ppm of sodium chloride. A hollow metal rotor attached to an externally provided mechanical stirring device was immersed in the test solution for a 24 hour time period. The solution was gradually heated by means of an electric heater present inside the hollow rotor and was maintained at a temperature of 118°F. during the test period. At the end of the 24 hours, the rotor was removed from the solution and from the stirrer, the scale deposited thereon removed, dried and weighed. The above laboratory test procedure affords good correlation between the results thereby obtained and actual field performance of scale preventing compositions.

The following table records the results of the tests.

TABLE

| Example | Amount of Additive (ppm) (% × 10⁴) | | | |
|---|---|---|---|---|
| | 0 | 5 | 10 | 15 |
| | Weight of Scale (gms) Deposited | | | |
| 1 Additive A | 1.8 | 0.1 | 0.0 | — |
| 2 Additive B | 1.8 | 0.0 | 0.1 | 0.0 |
| 3 Additive C | 1.9 | trace | 0.0 | — |
| 4 Additive D | 1.9 | 0.0 | 0.0 | |

A-Sulfonated pentaethoxy nonylphenol, sodium salt
B-Sulfonated pentaethoxy dodecylphenol, sodium salt
C-Sulfonated pentaethoxy pentadecylphenol, sodium salt
D-Sulfonated heptaethoxy pentadecylphenol, sodium salt Inspection of the data in the above table show that the compounds of the present invention are effective scale inhibitors in a wide range of concentrations.

It has been found that the scale prevention compositions of the present invention are especially effective in the presence of high calcium ion concentrations to 1% by weight or more, and particularly and somewhat uniquely in applications where high aqueous solution temperatures are encountered such as above 100°C. The compositions of the present invention are temperature stable and effective as scale inhibitors at temperatures up to about 150°C. e.g. 100°–150°C. Scale inhibitor compositions such as the admixture of sulfated/sulfonated polyethoxy $C_8$–$C_{14}$ alkylphenols and $C_8$–$C_{14}$ alkylbenzene sulfonates disclosed in copending, commonly assigned patent application Ser. No. 428,587 (D No. 73,764), filed Dec. 26, 1974, are likely not effective, at such temperatures, for the sulfated/sulfonated polyethoxy alkylphenol component thereof decomposes at such temperatures, permitting the alkylbenzene sulfonate component thereof to precipitate at calcium ion levels above about 0.005% (50 ppm), destroying the system's effectiveness.

The disclosed compositions may be prepared in the following manner:

The polyethoxy alkylphenol is treated with thionyl chloride for about 18 hours at about 100°C., to form the monochloro derivative, followed by reaction of said monochloro derivative with sodium sulfite for about 18 hours at about 155°C., in a 1/1 by volume admixture of water and ethanol in a Paar Bomb. The resulting recovered sulfonated product, on analysis, showed about 75% sulfonation of the terminal ethoxy group.

This method of preparation is exemplary only, but was the method employed to prepare the tested compositions. Those skilled in the art may perceive other synthetic schemes. For example, a sulfated ethoxylated alkylphenol may be treated with sodium sulfite at 200°C. for about 10–12 hours, resulting in relatively high yields (75–80%) of the desired sulfonated ethoxylated alkylphenol. Direct reaction of the ethoxylated alkylphenol and mixtures thereof with such reagents as sulfuric acid or chlorosulfonic acid results in sulfation.

The additives in examples 1–4 were prepared by reacting the appropriate alkylphenol with ethylene oxide and subsequently sulfonating them by the procedure hereinabove described.

Obviously, other modifications and variations of the invention as hereinbefore set forth may be made without departing from the spirit and scope thereof and therefore only such limitations should be imposed as are indicated in the appended claims.

We claim:

1. A method of controlling the build-up of inorganic mineral scale deposits in an aqueous system which comprises incorporating into said system a scale-treating composition consisting essentially of a sulfonated, ethoxylated compound having the general formula:

$$R(OCH_2CH_2)_nSO_3A^+$$

wherein R is an alkylphenyl group containing from about 6 to about 18 carbon atoms in the alkyl portion thereof, n is a number from one to about 10, including fractions, and $A^+$ is a monovalent cation selected from the group consisting of sodium, potassium, and ammonium, and mixtures thereof, in a concentration of from about 0.0005% to about 0.005%, on a weight basis.

2. Method as claimed in claim 1 wherein said compound is the sodium salt of sulfonated pentaethoxy dodecylphenol.

3. Method as claimed in claim 1 wherein said compound is the sodium salt of sulfonated pentaethoxy m-pentadecylphenol.

4. Method as claimed in claim 1 wherein said compound is the sodium salt of sulfonated heptaethoxy m-pentadecylphenol.

* * * * *